Oct. 23, 1962 A. W. RYBERG 3,059,481

CONTROL KNOB WITH VERNIER

Filed April 5, 1960

INVENTOR.
Arling W. Ryberg
BY Richard A. Mausen

United States Patent Office 3,059,481

Patented Oct. 23, 1962

3,059,481
CONTROL KNOB WITH VERNIER

Arling W. Ryberg, Scotia, N.Y., assignor to Empire Devices, Inc., Amsterdam, N.Y.

Filed Apr. 5, 1960, Ser. No. 20,143
9 Claims. (Cl. 74—10.5)

This invention relates generally to control knobs, and more particularly relates to tuning knobs for effecting fast or course tuning orientation and integrally providing fine control action.

In electronic and other equipment and instruments it is useful to provide a composite control knob that permits rapid scanning over a wide range and direct vernier adjustment when the desired general position is reached. For example, in operating a selective microwave receiver tunable over a wide range of frequencies, it is desirable to rapidly shift the tuned frequency to one on a remote dial position. However, desirably utilizes fine mechanical adjustment or tuning of the control shaft for precise final frequency positioning.

The present invention provides a novel, practical, simple and relatively inexpensive composite tuning or control knob assembly that combines rapid mechanical scanning with fine resolution. A single crank handle serves to turn the knob assembly directly, and thereby the system operating shaft connected to it. By small shift or displacement of the handle, one engages a self-contained friction drive and brake. Rotation of the handle thereupon effects vernier turning action of the knob assembly and of the connected shaft. Further, the knob assembly remains braked in the final selected position. A single handle is thereupon used for both the rapid and vernier control. An overriding clutch is incorporated as a safety feature.

It is accordingly an object of my present invention to provide a novel control knob assembly.

Another object of my present invention is to provide a novel composite fast acting control knob with vernier action.

A further object of my present invention is to provide a novel tuning knob assembly with rapid scanning and fine resolution effected from a single handle.

Still another object of my present invention is to provide a continuous tuning knob incorporating a disengageable friction drive and brake to effect fine tuning action, and brake the knob at the final position.

Still a further object of my present invention is to provide a novel tuning knob for composite fast and vernier control, incorporating an overrunning safety clutch.

These and further objects of this invention will become more apparent from the following description of an exemplary embodiment thereof, illustrated in the drawings, in which.

Figure 1:
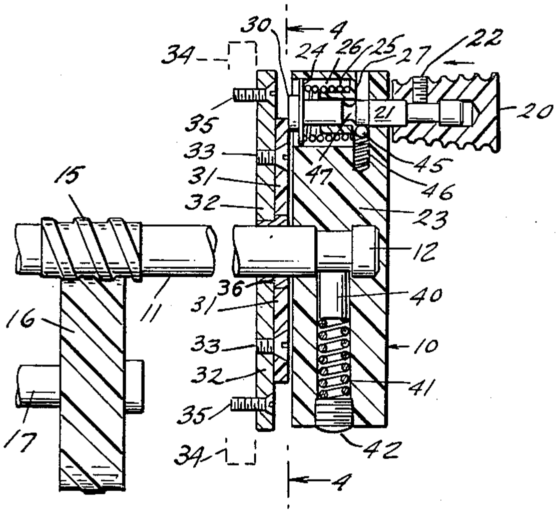
FIG. 1 is a cross-sectional view through the exemplary tuning knob assembly, in the fine tuning position, as taken along the line 1—1 of FIG. 2.

The knob assembly 10 is mechanically coupled to tuning mechanism, not shown, through suitable reduction gearing. The shaft 11 has a reduced diameter portion 12 that couples to the knob assembly 10. A worm gear drive 15, 16 serves as a speed reduction to drive shaft 17. Shaft 17 is connected to the tuning mechanism in a conventional manner. Other types of gear reduction may be used to effect a suitable turn ratio reduction between control shaft 11 and drive shaft 17. The selective rapid (direct) rotation of control shaft 11, or vernier movement thereof is effected through the single extending handle 20 of knob assembly 10.

Handle 20 is mounted on crank pin 21, and is fastened thereto by set-screw 22. Crank pin 21 extends through an opening in the body 23 of the knob assembly. Body 23 is desirably of cylindrical form. To the interior end of crank pin 21 is secured a washer 24. A helical spring 25 surrounds the interior section of pin 21, and nests within a suitable bore 26 in knob body 23. Spring 25 mechanically biases pin 21 into the "in" position as shown in FIG. 1, which is the vernier drive and/or brake position of the assembly 10. Spring 25 presses between crank pin washer 24 and an interior wall area 27. A flat cylindrical head 30 at the internal end of crank pin 21 coacts with the peripheral region of a circular friction plate 31.

Figure 2:
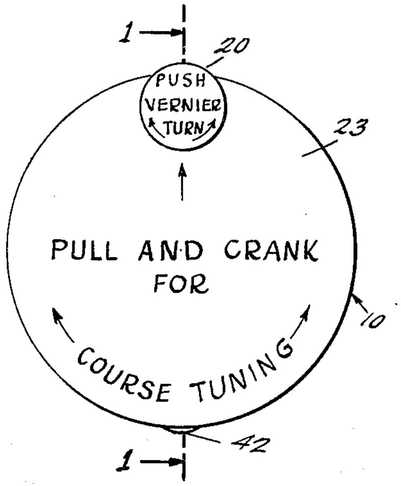
FIG. 2 is a front view of the tuner knob assembly.
Figure 4:
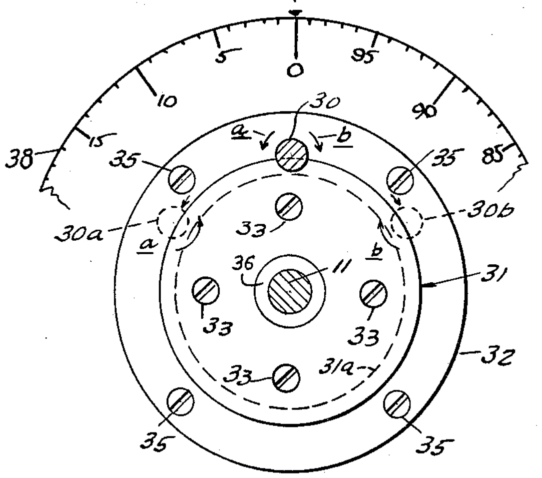
FIG. 4 is a cross-sectional view of a modified friction drive for the tuning knob.

Friction plate 31 is affixed to bearing plate 32 with machine screws 33, 33. A bearing 36, such of bronze is mounted in the center of plates 31, 32 to rotatably support shaft 11. Bearing plate 32 is fixedly supported to a frame member indicated in dotted line at 34, by screws 35, 35. Friction plate 31 is thus held stationary with respect to the rotatable portion of the knob assembly. By turning handle 20 in either direction, as indicated by the arrows on its face (see FIG. 2), the flat head 30 of pin 21 is made to ride along friction plate 31. FIG. 4 illustrates the peripheral region of friction plate 31 with which pin head 30 engages for this purpose. This region lies from dotted line circle 31*a* outwardly of the face of plate 31. A dial 38, indicated in FIG. 4, is suitably secured with control shaft 11 to indicate its angular position.

Rotation of crank handle, per se, counterclockwise per arrow *a*, causes the pin head 30 to ride or move along the periphery region of plate 31 in the counterclockwise direction as to position 30*a* shown in FIG. 4. The knob body 23 is thereby also rotated to the position 30*a*, turning shaft 11 correspondingly. More or less rotation of handle 20, results in proportional turning of knob 10 and shaft 11. A very large rotational reduction ratio exists between the respective turning of handle 20 and the corresponding angular displacement of control shaft 11. The pressure of spring 25 maintains firm frictional engagement between head 30 and friction plate 31, insuring direct vernier movement of shaft 11 when handle 20 is turned.

When the handle 20 is turned in the clockwise direction, per arrow *b*, the knob assembly 10 is rotated clockwise. Head 30 rides along the friction disc 31 peripheral region, as to position 30*b*, to effect vernier angular control on shaft 11. Upon release of handle 20 the spring 25 maintains the frictional engagement of crank pin head 30 with plate 31, and thereby firmly holds the knob assembly 10 in its last set position. Precise vernier turning of control shaft 11 is thereby effected in either direction. The material of friction plate 31 is optional, and may be steel or other metal; composition material including cork or asbestos; etc.

Figure 5:
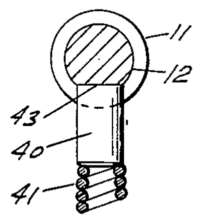
FIG. 5 shows a partial cross-sectional view of the connection between the tuner knob assembly and the drive shaft.

The control shaft 11 is coupled to the knob body 23 through a self-contained overriding clutch arrangement: a plunger 40 is spring pressed against the undercut section 12 of shaft 11 by helical spring 41, as shown in FIG. 1. Plunger 40 and spring 41 reside in a bore through body 23, and retained by screw plug 42. Sufficient frictional pressure is exerted between plunger 40 and the surface of shaft 12 to effect a firm connection with the knob assembly 10. However, should the gearing (15, 16) become jammed, or on the end of the scale reached, the frictional engagement is overridden, and the knob slips on the shaft 11 as a safety measure. The clutch 40, 41 is thus set to hold up to a preset torque. By further providing a flat 43 in undercut 12, a clicking sound is made when shaft 11 is frozen and the knob assembly 10 slips around it, due to plunger 40 being displaced by such flat 43. FIG. 5 shows the shaft 11 with the coacting flat 43 at region 12, against plunger 40. This also provides for positive indexing.

Figure 3:
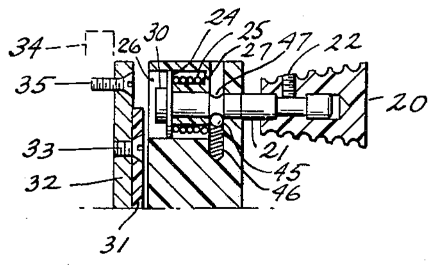
FIG. 3 shows a cross-section of the control portion of the knob assembly, in the fast tuning position.

To effect fast turning of control shaft 11, one simply pulls crank 20 outwardly, i.e. away from the knob body 23, to the right in FIGS. 1 and 3. This movement shifts crank pin 21 and compresses biasing spring 25. Friction head 30 is disengaged from friction plate 31, as shown in FIG. 3. A detent arrangement is provided to hold the handle 20 in such disengaged position, once displaced. The detent comprises a steel ball 45 pressed by helical biasing spring 46 into a grooved or undercut section 47 of crank pin 21. The handle 20 is thereupon used as crank for knob body 23, and the control shaft 11 is rotated once for each turn. With handle 20 gripped, crank pin 21 is free to rotate while detented, in the fast turning of shaft 11.

The operation of the knob assembly hereof is very simple and direct. One merely grips the handle 20 and pulls it outwardly for fast scanning or course tuning. This is performed clockwise or counterclockwise by cranking the knob body 23, as indicated on its face in FIG. 2. The detent 45, 46 holds the knob body 23 free from frictional engagement, and ready, direct, rapid turning of the control shaft (11) occurs. By simply pushing-in the handle 20, the detent 45, 46 is overridden, and biasing spring 25 engages head 30 with frictional plate 31. Finger turning of handle 20 results in clockwise or counterclockwise vernier rotation of the knob body 23 and control shaft 11.

The spring 25 holds head 30 in continuous engagement with plate 31, and thereby provides a brake to hold the shaft 11 in its last precise tuned-in position. Also, the overriding clutch 40, 41 serves as a safety element, to disengage the knob assembly from shaft 11 in the event it is turned while shaft 11 is at an end stop or is jammed. The flat 43 on shaft 11 (FIG. 5) serves to alert one by clicking when such condition occurs.

Figure 6:
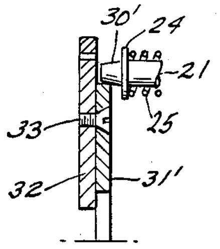
FIG. 6 shows a partial cross-sectional view of a modified crank pin head.

FIG. 6 is a partial cross-sectional view showing a modified crank pin head 30′ for pin 30. Head 30′ is a conical roller that engages the outer surface or periphery of the friction disc 31′. In this form friction plate 31′ is preferably of steel. The vernier action is the same as that of flat head 30 already described. Also the brake function is retained. The FIG. 6 position of head 30′ is in the "push" or inward mode, for the vernier action drive, corresponding to that of FIG. 1. For course tuning, head 30′ is disengaged, in the "pull" mode.

Although I have described exemplary embodiments of the invention knob assembly, it is to be understood that modifications and variations thereof may be made by those skilled in the art without departing from the broader spirit and scope thereof as defined in the claims.

I claim:

1. A control knob assembly comprising a body securable to a control shaft through a central opening thereof, a crank pin for a knob displaceably carried by said body through an opening parallel to the shaft opening, a head at the interior end of said crank pin, a stationary plate disposed adjacent a surface of the body for coaction with said head, a spring arranged to bias said head against said plate for displacement thereof along said plate upon rotation of said crank pin to thereby effect vernier displacement of the body and the shaft therewith, and a detent for said crank pin to hold said head disengaged from said plate upon a shift of the crank away from the plate to permit direct cranking of the shaft through the body, knob and crank pin.

2. A control knob assembly of the character described comprising a body of cylindrical form securable to a shaft through a central opening thereof, a handle displaceably carried by said body through an opening in a peripheral region thereof, a head at the interior end portion of said handle, a stationary friction plate disposed parallel to a surface of the body for coaction with said head, a spring within said body arranged to bias said head outwardly of the body against said plate for frictional displacement of the head along the peripheral region of said plate upon rotation of said handle to thereby effect corresponding vernier angular displacement of the body and the shaft therewith, and a detent carried in said body for said handle to hold said head disengaged from said plate and against its spring bias upon a shift of the handle away from the plate to permit direct turning of the shaft through the handle.

3. A control knob assembly as claimed in claim 1, further including a torque responsive overload release coupling within said body for engaging said body and control shaft.

4. A control knob assembly as claimed in claim 2, further including a torque responsive overload release coupling within said body for engaging said body and control shaft to a predetermined torque limit, and disengaging them when the torque limit therebetween is exceeded.

5. A control knob assembly as claimed in claim 1, in which the crank pin head is cylindrical in form with a flat face coactable with said plate along a parallel peripheral region thereof.

6. A control knob assembly as claimed in claim 2, in which the crank pin head is tapered and coactable with the outer surface of the plate, said plate being in disc form.

7. A control knob assembly as claimed in claim 4, in which said detent comprises a ball pressed against said pin by a second spring, effecting the detenting action when abutting a cut-out section of the shaft, and said coupling comprises a plunger pressed against a shaft portion by a third spring effecting the predetermined torque.

8. A control knob assembly as claimed in claim 3, in which said coupling comprises a plunger pressed against a shaft portion by a second spring and said shaft portion contains a flat in cooperation with the plunger.

9. A control knob assembly comprising a body securable to a shaft to be controlled, a crank pin for a knob rotatably held in said body, a head at the interior end portion of said crank pin, a stationary plate disposed for frictional coaction with said head, said crank pin and head being shiftable in said body with respect to said plate, and means for selectively maintaining said head shifted into and out of frictional engagement with said plate whereby rotation of said crank pin effects vernier angular displacement of said body and shaft, with said head and plate engagement holding the knob assembly and shaft in a braked condition at their vernier settings, said selective means including a member for holding said crank pin shifted with its head disengaged from said plate to permit direct cranking of the shaft through the knob, crank pin and body.

References Cited in the file of this patent

UNITED STATES PATENTS

| | | |
|---|---|---|
| 1,299,765 | Norton et al. | Apr. 8, 1919 |
| 2,096,510 | Gates | Oct. 19, 1937 |
| 2,445,211 | Drake | July 13, 1948 |

FOREIGN PATENTS

| | | |
|---|---|---|
| 117,234 | Austria | Apr. 10, 1930 |
| 475,532 | Great Britain | May 22, 1936 |